Figure 1:
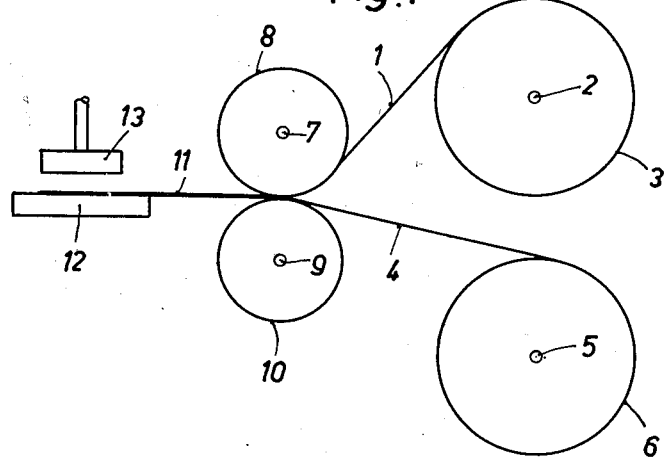

Dec. 16, 1952  B. LIEDER  2,622,055

CORNER MOUNTS AND METHOD AND APPARATUS FOR MAKING SAME

Filed Feb. 23, 1951

Inventor
Bruno Lieder
By
Young, Emery & Thompson
Attys.

Patented Dec. 16, 1952

2,622,055

UNITED STATES PATENT OFFICE 2,622,055

CORNER MOUNTS AND METHOD AND APPARATUS FOR MAKING SAME

Bruno Lieder, Eislingen-on-the-Fils, Germany, assignor to Papierfabrik Fleischer G. m. b. H., Eislingen/Fils, West Germany Application February 23, 1951, Serial No. 212,315
In Germany March 18, 1950

5 Claims. (Cl. 154—125)

This invention relates to a method for making corner mounts or mounting corners for securing photographs and other card-like articles at their corners to a backing, for example, an album leaf, and to a device for carrying out the method. Corner mounts are known which merely have a transverse slit through which the photograph is pushed, and the invention does not relate to corner mounts of this kind but to the kind having a small pocket into which a corner of a photograph, card, or the like may be inserted. Such pocket type corner mounts were heretofore made of a single piece of sheet material, for example paper, cellophane, or other synthetic material in sheet form, folded and glued; in some such mounts the pockets, of folded transparent or opaque material, were adhered to a paper corner gummed on the back for attachment to an album leaf or other backing.

The object of the present invention is to produce pocket type corner mounts and other similar pocket mounts, for example for holding postage stamps, in a simple and inexpensive manner.

The invention consists in joining together two strips of sheet material, for example paper, cellophane, fabric, or the like, along one or more lines corresponding to the boundary of the pocket to be formed, said joining being by grooving, cementing, or welding, after which the pockets are cut out along these lines. Any folding or further processing of the cut out pockets is thus eliminated.

The process of the invention can be carried out continuously or batch-wise. In continuous operation, the two strips of material are joined together, without interruption, at seams formed along one or more spaced boundary lines, whereupon the thus joined strips are cut into sections or single pockets. In batch-wise operation, the material strips are also fed continuously, but the joining is effected batchwise along a boundary or boundaries, whereupon the joined area is cut off or cut out, for example between the members of a suitable punch.

A further feature of the invention consists in that at least one of the strips consists, at least on its upper surface, of a thermo-adhesive or heat sealing material in such a manner that, at the places subjected to heat and pressure, the strips are cemented together.

According to one procedure the strips are passed between heated rolls which are profiled according to the pattern of joining. In another procedure the strips are passed between heated punches. Preferably the means for joining the strips are adapted also to cut out the joined areas, especially when the joining is effected by punches.

Further features of the invention will appear from the following examples in conjunction with the accompanying diagrammatic drawing, and will be pointed out in the claims.

Figure 2:
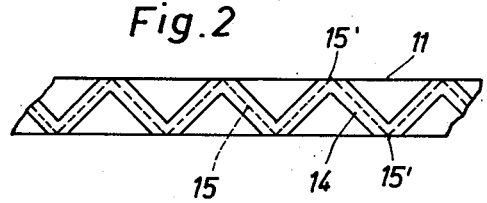
Figure 3:
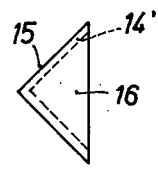
Figure 4:
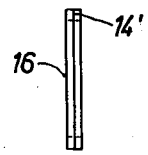

In the drawing:

Fig. 1 is a diagrammatic view of the apparatus for carrying out the method of the invention, Fig. 2 is a plan view of the joined strips of sheet material for making the corner mounts, Fig. 3 is a front elevation of the mount, and Fig. 4 is a side elevation of a corner mount made from the joined strips of Fig. 2.

According to Fig. 1 a first strip 1 of sheet material is taken off from a roll 3 rotatable on an axis or axle 2. A second strip 4 of sheet material is taken off from a roll 6 rotatable on an axis or axle 5. Both strips pass between rollers 8 and 10 rotatable about axes or axles 7 and 9 respectively. In one embodiment, at least one of the rollers 8 and 10 is heated, and is so profiled that the strips, at least one of which consists, at least on its upper surface, of thermoadhesive material, are joined together along a zig-zag track 14. The double strip formed in this way arrives between punch members 12 and 13 by which it is cut either into single corner mounts, or into units comprising several such mounts. According to another mode of operation the cutting is effected simultaneously with the joining of the strips between the rollers 8 and 10, in which case the rollers are provided on their peripheries also with suitable cutters. In a further mode of operation the rollers 8 and 10 act only as feed rolls and zig-zag joining of the strips according to Fig. 2 is effected between heated punch members 12 and 13 which if desired, may also have cutters to sever the strips simultaneously with the joining. In this case the strips are conveyed continuously through the rollers 8 and 10, but the joining is effected intermittently by the punch members 12 and 13. The joining of the two strips need not be effected singly for each corner mount, as the punch members 12 and 13 may be adapted to join the strips over a length unit including several mounts. The heating of the punch members 12 and 13, and of the rollers 8 and 10, in the first example, can be effected in any suitable manner. Means may also be used to ensure uniform feed of the strips 1 and 4 and to hold them taut, as well known and understood in mechanisms for handling strip material.

As shown in Fig. 2, the strip is divided by the zig-zag track 14 in such a manner that the corner pockets lying alternately along one and the other edge of the joined strip, can be severed along a zig-zag line 15 at the middle of the track 14. While the severing line 15 extends to the edges of the strip, the adhered area 14 is always truncated at the edge places 15'. Therefore the strips united in this manner can be severed without waste into corner mounts of the pocket type. The two strips need not be of equal width. The lower side of the corner mount, which is to be stuck onto an album leaf or other backing and is gummed for this purpose, may, if desired, be wider than the upper side of the corner mount, and in the case of a triangular mount, may project along the hypotenuse. If the projecting part is cut with square corners, there is also no waste material. However, the projecting part can be cut in any desired shape. Also modifications are possible in which the corner mounts are not completely severed, but the joined strips are merely grooved or perforated at the lines of separation, so that the corner mounts can be removed singly as required, for example from a roll of the joined strips. The grooving or perforating can be effected, similarly to the severing, by the same appliances used to join the strips.

Another mode of operation employs strips the width and subdivision of which constitute a multiple of the strip shown in Fig. 2. In this case the broader strips are either first divided into strips such as shown in Fig. 2 which are then further processed in the hereinbefore described manner, or the wider strips can be directly severed, grooved, or perforated into the individual corner mounts.

The hereinbefore described methods and apparatus can be used not only to make pocket type corner mounts for photographs and the like, but also to make any kind of small pocket type mount formed by uniting two strips of material around a boundary line. The boundary line thus may depart from the right-angle corner shown in the drawing, for example it could be U-shape. Also boundary lines of other than angular shape can be disposed in a continuous series side by side to produce pocket type mounts of other shapes.

I claim:

1. A method of making pocket type corner mounts for photo prints and stamps, comprising guiding two strips of sheet material one on the other, joining the two strips of sheet material along a zig-zag line from one side of at least one strip sheet to the other to form the boundary line of the pockets, and then separating the pockets along said joining line.

2. A method according to claim 1, in which the strips are joined by continuously forming a seam along the boundary line of a plurality of pockets disposed side by side and which are separated along the seam of adjacent pockets.

3. A method according to claim 1, in which at least one of the strips is of thermo-adhesive material at least on its upper surface, enabling said strip to be joined to the other strip by heat and pressure applied along said boundary lines.

4. Apparatus for making pocket type corner mounts for photographs and stamps, comprising means for joining strips of material along a zig-zag path simultaneously forming a separating seam in the joined strip path which form the pockets.

5. Pocket type mounts for photographs and stamps, comprising a strip of two layers of material joined along a zig-zag path from one side to the other forming pockets and separating seams in the zig-zag path.

BRUNO LIEDER.

REFERENCES CITED

The following references are of record in the file of this patent:

UNITED STATES PATENTS

| Number | Name | Date |
|---|---|---|
| 1,174,069 | Hosford | Mar. 7, 1916 |
| 1,410,555 | Dexter | Mar. 28, 1922 |
| 1,668,782 | Roberts | May 8, 1928 |
| 2,125,758 | Waters | Aug. 2, 1938 |
| 2,237,346 | Gilfillan | Apr. 8, 1941 |
| 2,304,787 | Avery | Dec. 15, 1942 |
| 2,482,981 | Kamrass | Sept. 27, 1949 |
| 2,560,566 | Graves et al. | July 17, 1951 |
| 2,566,249 | Rainey et al. | Aug. 28, 1951 |

FOREIGN PATENTS

| Number | Country | Date |
|---|---|---|
| 636,532 | Germany | Oct. 10, 1936 |
| 575,353 | Great Britain | Feb. 14, 1946 |